Nov. 9, 1965 L. R. DUNCAN, JR., ETAL 3,217,275
MULTICOUPLER SYSTEM UTILIZING TUNABLE TRAP
Filed June 1, 1962 3 Sheets-Sheet 1

INVENTORS
THOMAS R. CUTHBERT JR.
LONEY R. DUNCAN JR.
MERRILL T. LUDVIGSON
BY
Moody and Harris
ATTORNEYS Nov. 9, 1965 L. R. DUNCAN, JR., ETAL 3,217,275
MULTICOUPLER SYSTEM UTILIZING TUNABLE TRAP
Filed June 1, 1962 3 Sheets-Sheet 2

INVENTORS
THOMAS R. CUTHBERT JR.
LONEY R. DUNCAN JR.
MERRILL T. LUDVIGSON
BY
Moody and Harris
ATTORNEYS

United States Patent Office 3,217,275
Patented Nov. 9, 1965

3,217,275
MULTICOUPLER SYSTEM UTILIZING
TUNABLE TRAP
Loney R. Duncan, Jr., Marion, and Merrill T. Ludvigson, Cedar Rapids, Iowa, and Thomas R. Cuthbert, Jr., Richardson, Tex., assignors to Collins Radio Company, Cedar Rapids, Iowa, a corporation of Iowa
Filed June 1, 1962, Ser. No. 200,031
6 Claims. (Cl. 333—76)

This invention relates to a multicoupler system, and more particularly to an improved coupling circuit utilizing a tunable trap in conjunction with resistance means in a manner such that a single antenna may be used with a plurality of transmitters and receivers.

It is oftentimes desirable to connect a plurality of transmitters and receivers to a common antenna. While various systems have been proposed and/or utilized for this purpose, however, none has been completely successful, heretofore, either in achieving the necessary isolation between the transmitters and receivers so connected to the common antenna, or have achieved the necessary isolation at the expense of power transfer.

The necessity for isolation can be shown, for example, by considering an antenna having two transmitters and a receiver connected thereto. When the first transmitter sends an output signal to the antenna, this output signal, in the absence of an effective block, will also appear at the plate of the power amplifier of the other transmitter. If this transmitter is also operating, this causes intermodulation products, which, again in the absence of an effective block, can cause interference in the receiver at the receiver operating frequencies.

It is thus obvious, that if a plurality of transmitters and receivers are to be used with a common antenna, a very effective block must be established from the antenna to the transmitter or receiver. Also since this block might not be totally effective, the block must also provide forward attenuation. In other words, the multicoupler supplying the block must not only provide back attenuation to reduce the signals from other transmitters to prevent intermodulation products, but must also provide forward attenuation to reduce the intermodulation products generated.

From the foregoing, it should be readily appreciated that as the number of transmitters connected to the antenna increases, the number of intermodulation frequencies that may be generated likewise increases, and soon makes it impossible to have any receiver connected to the antenna unless an extremely effective multicoupler circuit is employed.

It is therefore an object of this invention to provide an improved multicoupler capable of providing necessary impedance isolation and selectivity and yet still provide good power efficiency.

More particularly, it is an object of this invention to provide an improved multicoupler having a coupling circuit that includes a tunable trap and resistance means whereby necessary impedance isolation is attained without loss of power efficiency at operating frequencies.

Still more particularly, it is an object of this invention to provide a novel multicoupler having a coupling circuit that includes a trap circuit and resistance means connected thereto in such a manner that said trap circuit effectively shorts out said resistance means only at operating frequencies thereby maximizing power transfer at said operating frequencies and yet imposing resistance in said coupling circuit at other frequencies to provide necessary isolation.

With these and other objects in view which will become apparent to one skilled in the art as the description proceeds, this invention resides in the novel construction, combination and arrangement of parts substantially as hereinafter described and more particularly defined by the appended claims, it being understood that such changes in the precise embodiments of the herein disclosed invention may be included as come within the scope of the claims.

The accompanying drawings illustrate two embodiments of this invention constructed according to the best mode so far devised for the practical application of the principles thereof, and in which.

Figure 1:
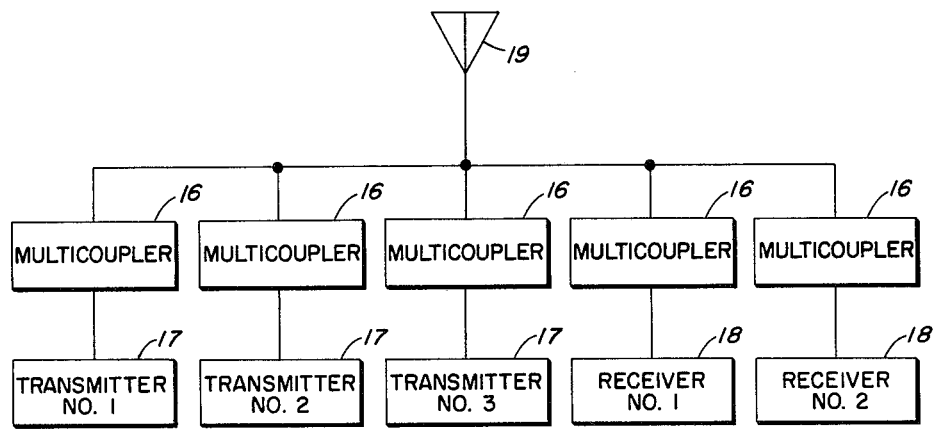
FIGURE 1 is a block diagram illustrating the use of a plurality of multicouplers with a like plurality of receivers and transmitters to couple said transmitters and receivers to a common antenna.

Referring now to the drawings in which like numerals have been used for like characters throughout, the numeral 16 indicates generally a multicoupler, which multicoupler, as shown in FIGURE 1, may be utilized to connect a plurality of transmitters 17 or receivers 18 to a common antenna 19.

The purpose of any multicoupler circuit is, as brought out hereinabove, to couple the signal between the transmitter or receiver and the antenna without appreciable power losses and yet couple the signal in a manner such that a number of transmitters and receivers may be connected to the same, or common, antenna for operation at different frequencies without interfering with one another.

Figure 2:
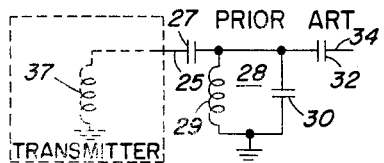
FIGURE 2 is a schematic diagram of a known coupling circuit having a top coupled input to a tuned tank circuit therein.

As shown in FIGURE 2, a multicoupler coupling circuit may be provided having an input line 25 which may be connected to a transmitter 17. The input R.F. signal is top coupled through a blocking capacitor 27 to tuned tank circuit 28, which tank circuit may include a coil 29 and a capacitor 30 and is grounded at the side opposite the top coupled input. As is conventional, although not shown as such herein, either coil 29 or capacitor 30 may be variable to make the tank circuit tunable over a predetermined range of frequencies. Tuned tank circuit 28 is resonant at the operating frequency and thereby determines the frequencies to be passed by the coupling circuit. The R.F. signal may be coupled from the circuit in any conventional manner, such as, for example, by top coupling from tuned tank circuit 28 through capacitor 32 and output line 34, which output line may be connected to antenna 19.

Figure 3:
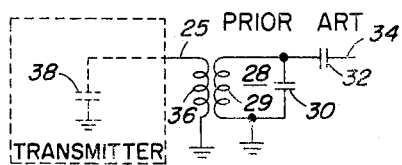
FIGURE 3 is a schematic diagram of a known coupling circuit having a link coupled input to a tuned tank circuit therein.

In lieu of a top coupled input to tuned tank circuit 28, a link coupled input may be provided, as shown in FIGURE 3, by link coil 36, one end of which is connected to input line 25 and the other end of which is connected to ground. The link coupling, of course, is between link 36 and coil 29 of tuned tank circuit 28.

The circuits described hereinabove provide equivalent selectivity and both are susceptible to resonant holes in both impedance and attenuation when they are fed from a conventional transmitter through a transmission line rather than from a purely resistive source impedance. An analysis of this type of multi-coupler circuit made with a 50 ohm purely resistive source impedance makes it appear as if no problem exists since the holes are very close to the operating frequency. However, this type of circuit is usually fed from a transmitter which does not have a 50 ohm purely resistive source impedance and, as a result, actually becomes highly resistive even over a small frequency range.

The circuit shown in FIGURE 2 has impedance holes at or near the frequency at which the reflected transmitter reactance (indicated as inductive reactance 37 by dotted lines in FIGURE 2) nearly equals the reactance of capacitor 27. This is not exactly at the resonant frequency because the series combination must resonate with the remainder of the reactive elements to produce the short across the antenna line.

Figure 7:
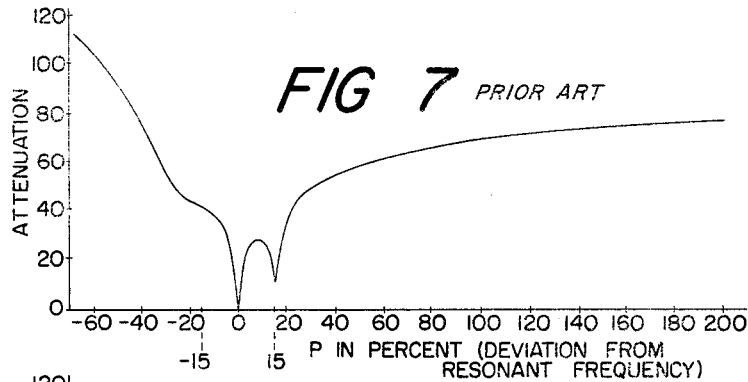
FIGURE 7 is a graphical presentation illustrating typically an attenuation hole that can occur in the known coupling circuits illustrated in FIGURES 2 and 3.

While not so obvious, it can also be shown that an impedance hole exists in the circuit shown in FIGURE 3 where the reflected transmitter reactance (indicated as capacitive reactance 38 by dotted lines in FIGURE 3) equals approximately the reactance of coil 36. FIGURE 7, by way of example, shows typically how an impedance hole can exist utilizing a coupling circuit as shown in FIGURES 2 or 3. It should also be noted that utilization of a double coupled circuit having an additional parallel tank eliminates the impedance hole but not the attenuation hole.

Figure 4:
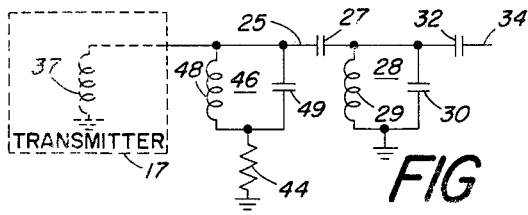
FIGURE 4 is a schematic diagram of a coupling circuit similar to that of FIGURE 2 but including a trap circuit and resistance means as taught by this invention.

It has been found, however, that by utilizing a trap circuit in conjunction with resistance means in the coupling circuits described hereinabove, the impedance and attenuation holes may both be eliminated. As shown in FIGURE 4, such a trap circuit and resistance means are provided for a coupling circuit having top coupled input to tuned tank circuit 28. As shown, a resistor 44 has one side connected to input line 25 through parallel tank 46, which tank includes a coil 48 and a capacitor 49, and the other side connected to ground. In operation, the parallel trap 46 acts to effectively eliminate resistor 44 at operating frequencies but allows the resistor to be a factor at frequencies other than operating frequencies.

Parallel resistor 44 could be used with trap circuit 46 either to prevent resonance of the back reflected reactance of the transmitter with capacitor 27 or to de-Q the resonance circuit. It has been found that it is not necessary to prevent resonance if a sufficiently low Q is obtained. To prevent resonance, a resistor slightly smaller than twice the reactance of capacitor 27 would have to be used.

However, if resistor 44 should be directly connected to input line 25 a compromise must then be made between efficiency and proper operation of the shunting resistor. This is due to the fact that the smaller the resistor the more effective it is in preventing holes, while the larger the resistor the more efficient the circuit becomes.

To avoid the necessity for this compromise, resistor 44 is used in series with parallel trap 46. This enables resistor 44 to be selected as to value for optimum selectivity (i.e., prevention of impedance and attenuation holes) without regard to the efficiency of the coupling circuit since parallel trap 46 effectively eliminates resistor 44 from the coupling circuit at operating frequencies.

Figure 5:
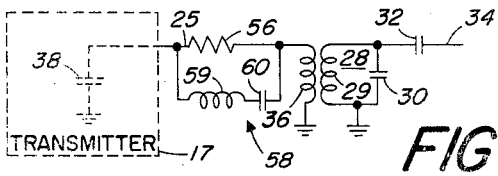
FIGURE 5 is a schematic diagram of a coupling circuit similar to that of FIGURE 3 but including a trap circuit and resistance means as also taught by this invention.

As shown in FIGURE 5, if the coupling circuit has link input coupling to the tuned tank circuit, a resistor 56 is incorporated in the input line in series with the link input coil for obtaining optimum selectivity. While this resistor might also be used without a trap circuit, a compromise would again be necessary since the larger the resistor the more effective it is in eliminating holes but the lower the efficiency of the circuit becomes. To avoid this compromise, a series trap 58 is provided in parallel with resistor 56, which trap comprises an inductor 59 and a capacitor 60. When off the resonant frequency of trap 58, resistor 56 is in the coupling circuit to eliminate attenuation and impedance holes. When at the resonant frequency, the trap shorts out resistor 56 and thereby prevents power from being dissipated therein.

Figure 6:
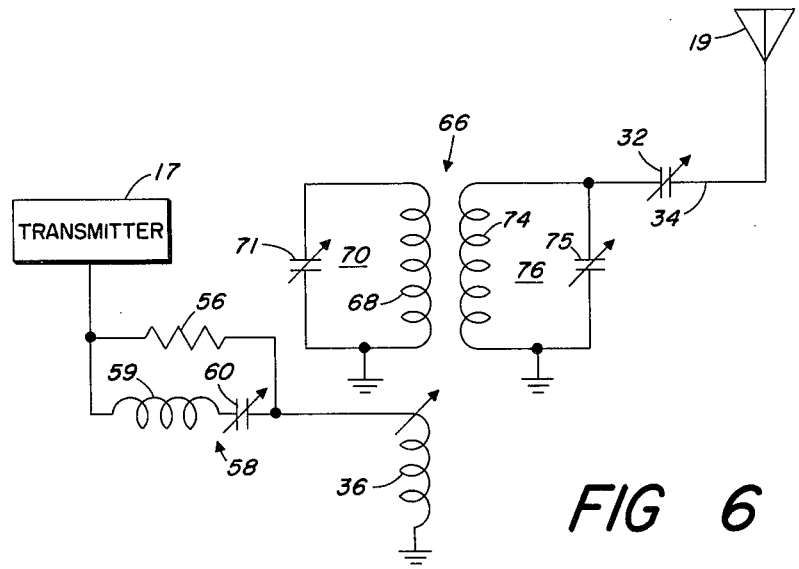
FIGURE 6 is a schematic diagram similar to FIGURE 5 showing a trap circuit and resistance means as taught by this invention utilized in conjunction with a coupling circuit having a double tuned tank circuit and link coupled input thereto.

As shown in FIGURE 6, if a double tuned tank circuit 66 is provided in the coupling circuit with link input coil 36 coupled to coil 68 of input tuned tank 70, which tank also has a variable capacitor 71, resistor 56 may still be connected in series with the link input coil. Also, series trap 58 may likewise still be utilized to short out resistor 56 at operating frequencies. As shown in FIGURE 6, capacitor 60 may be made variable, if desired, as may the inductor 74 or the capacitor 75 (so shown) of output tuned tank circuit 76.

Figure 8:
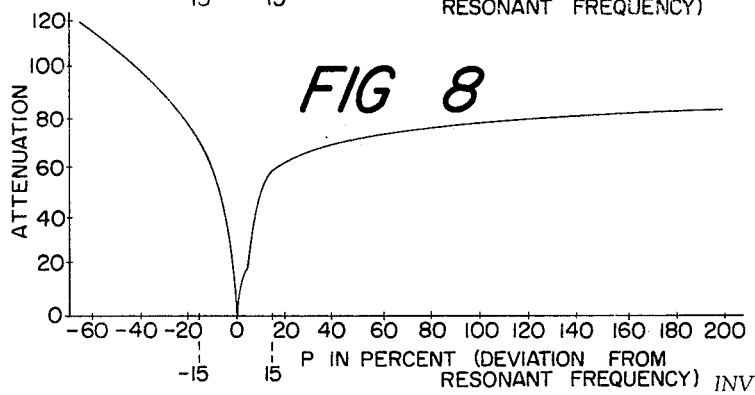
FIGURE 8 is a graphical presentation illustrating how the attenuation hole shown in FIGURE 7 is avoided by use of the trap circuit and resistance means of this invention.
Figure 9:
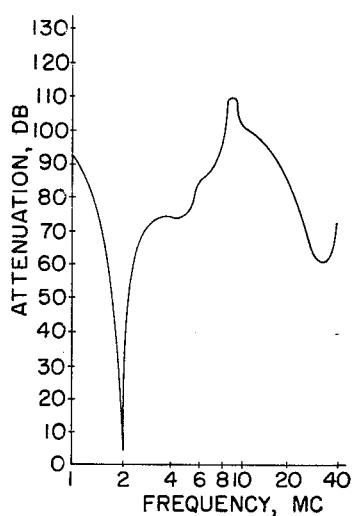
FIGURES 9 through 12 are graphical presentations illustrating the high selectivity tuning gained by utilization of the coupling circuit shown in FIGURE 6 when properly tuned to various selected frequencies.
Figure 10:
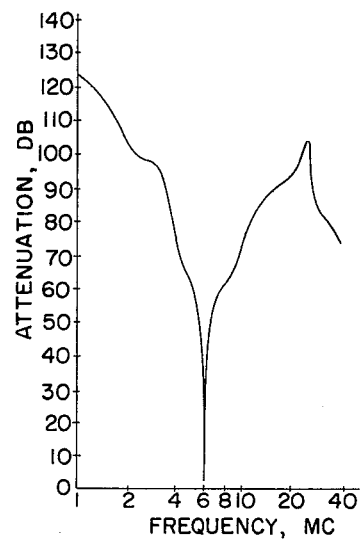
Figure 11:
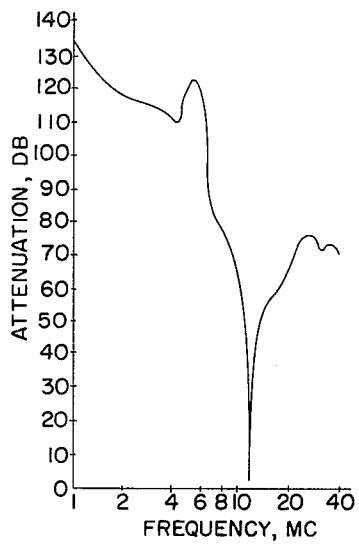
Figure 12:
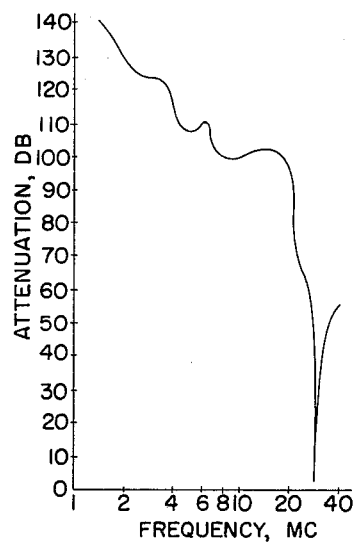

As brought out hereinabove, if the trap circuit and resistance means are not included in the coupling circuit, such as shown in FIGURES 2 and 3, an attenuation hole can exist as shown typically by FIGURE 7 where the attenuation hole is 15% off of resonant frequency. As shown by FIGURE 8, however, when the trap circuit and resistor are placed in the circuit, this hole is eliminated.

Moreover, when the tank and trap circuits are tuned properly to a predetermined operating frequency, the coupling circuit according to this invention precludes all attenuation and impedance holes and yet has high efficiency at operating frequencies regardless of the frequency selected. This is shown, for example, by FIGURES 9 through 12, taken after properly tuning the circuit of FIGURE 6 to the selected frequencies as indicated.

The complete coupling circuit shown in FIGURE 6, along with means for automatically tuning the variable elements therein, form the subject matter of United States Patent Application, Serial No. 200,029, now Patent No. 3,160,833, entitled, Multicoupler Impedance Matching Network, filed Junet 1, 1962, by Merrill T. Ludvigson, Loney R. Duncan, Jr., and Virgil L. Newhouse, and assigned to the assignee of the present invention.

In view of the foregoing, it should be evident to those skilled in the art that the coupling circuit of this invention provides effective means whereby impedance isolation and selectivity is attained without adversely affecting power efficiency.

What is claimed as our invention is:

1. In a system including radio frequency signal processing means and an antenna means, said radio frequency signal processing means being constructed to operate with signals within a predetermined frequency bandwidth, coupling means connecting said radio frequency signal processing means to said antenna means, said coupling means comprising first parallel tuned circuit means connected in parallel with said antenna means and tuned near the center of said predetermined frequency bandwidth, resistive means constructed to substantially block signals passing between said antenna means and said radio frequency signal processing means, and second tuned circuit means constructed to effectively remove said resistive means from said coupling means when a signal in the predetermined frequency bandwidth is present.

2. Coupling means in accordance with claim 1 in which said second tuned circuit means and said resistive means are connected in series arrangement, said series arrangement means being connected in parallel with said first parallel tuned circuit means, and in which said second tuned circuit means is a parallel tuned circuit tuned substantially to the same resonant frequency as said first parallel tuned circuit means.

3. Coupling means in accordance with claim 1 in which said resistive means is connected in series with said radio frequency processing means and said antenna means and in which said second tuned circuit means is a series tuned circuit connected in parallel with resistive means and tuned to substantially the same resonant frequency as said first parallel tuned circuit means.

4. In a system comprising an input means and an output means, coupling means connecting said input means to said output means, said coupling means comprising first parallel tuned circuit means connected in parallel with said output means and tuned to be resonant at the nominal center frequency of a predetermined bandwidth, resistive means constructed to substantially block signals passing between said input means and said output means, and second tuned circuit means constructed to effectively remove said resistive means from said coupling means when a signal in the predetermined frequency bandwidth is present.

5. Coupling means in accordance with claim 4 in which said second tuned circuit means and said resistive means are connected in series arrangement, said series arrangement means being connected in parallel with said first parallel tuned circuit means and in which said second tuned circuit means is a parallel tuned circuit tuned substantially to the same resonant frequency as said first parallel tuned circuit means.

6. Coupling means in accordance with claim 4 in which said resistive means is connected in series with said input means and said output means, and in which said second tuned circuit means is a series tuned circuit connected in parallel with said resistive means and tuned to the said nominal center frequency of said frequency bandwidth.

References Cited by the Examiner

UNITED STATES PATENTS

| | | | |
|---|---|---|---|
| 1,597,420 | 8/26 | Austin | 333—76 |
| 2,111,743 | 3/38 | Blumlein et al. | 343—860 |
| 2,138,996 | 12/38 | Blumlein | 333—76 |
| 2,169,352 | 8/39 | Bushbeck | 333—76 |
| 3,049,667 | 4/62 | Broadhead | 325—489 |

FOREIGN PATENTS 970,662  10/58  Germany.

HERMAN KARL SAALBACH, *Primary Examiner*.